May 7, 1968  R. E. SMITH ET AL  3,382,395

PROJECTION LAMP WITH GLASS REFLECTOR SPRING CLIP SUPPORT

Filed Dec. 28, 1965

RICHARD E. SMITH
CHESTER C. BLAIR JR.
*INVENTORS*

BY *Joseph C. Ryan*

ATTORNEY 3,382,395
PROJECTION LAMP WITH GLASS REFLECTOR
SPRING CLIP SUPPORT
Richard E. Smith, Lexington, and Chester C. Blair, Jr., Winchester, Ky., assignors to Sylvania Electric Products Inc., a corporation of Delaware
Filed Dec. 28, 1965, Ser. No. 516,950
2 Claims. (Cl. 313—113)

ABSTRACT OF THE DISCLOSURE

A projection lamp of the type having a glass reflector disposed therein in which the means for supporting the reflector includes a substantially rectangular spring clip having turndown edges at the corners to define bearing surfaces which abut the back of the reflector.

---

This invention relates to electric incandescent lamps and more particularly to lamps designed primarily for use as light sources in photographic projection devices, such as motion picture projectors for example.

Years ago, these lamps were designed for use with an external reflector or with a metallic reflector deposited on the inside wall of the lamp envelope. More recently, lamps having built-in reflectors have received wide acceptance. In these lamps the reflectors are physically separate and spaced from the inner wall of the lamp envelope and are supported by some form of mounting structure upstanding on the glass disc or header sealed in an end of the lamp envelope. A number of different mounting arrangements for such a reflector have been suggested and many of them present problems.

In the case of glass reflectors, there is a problem of insuring proper positioning of the reflectors with a minimum of damage due to glass breakage. In accordance with some techniques, suitable metal parts are inserted into the glass. In some cases this is supplemented by a mechanical device which wedges an insulator, a copper shim and the glass piece together. This type of arrangement usually results in a high percentage of mirror breakage around the supporting points. In accordance with other techniques, the reflectors or mirrors are held by a harness assembly which includes the use of notches in the glass and the application of spring tension. However, this type of arrangement usually results in a number of inferior reflectors due to cracks around the notches. This technique also requires a relatively complicated assembly procedure.

In accordance with the principles of this invention, the mirror or reflector is provided with a central elongated aperture within which a ceramic plug is located. The plug is locked in the reflector by a spring clip and wedges.

In the specific embodiment of the invention illustrated in the accompanying drawing, FIGURE 1 is a front elevational view of a projection lamp.

Figure 1:
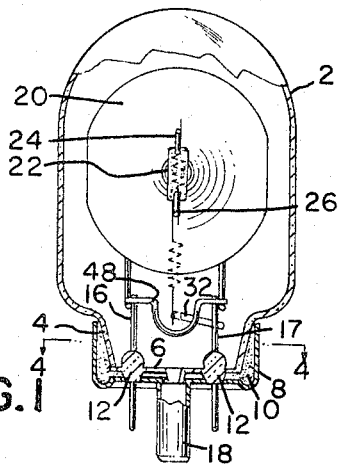
Figure 2:
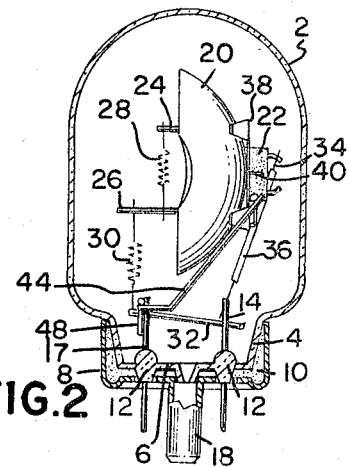
FIGURE 2 is a side elevational view of the lamp of FIG. 1, showing the spring clip-wedge arrangement for supporting the reflector.

In the specific embodiment of the invention illustrated in the accompanying drawing, the projection lamp comprises a substantially tubular lamp envelope 2, one end of which is constricted to define a bulb neck 4. A glass disc or header 6 is hermetically sealed to the bulb neck 4 and this end of the lamp is provided with a base 8 which is secured thereto by basing cement 10. The header 6 is provided with a plurality of spaced nubbins or bosses 12 through which stiff lead-in wires 14, 15, 16 and 17 are sealed. The inner ends of these lead-in wires serve as support members and the outer ends thereof project through holes provided therefor in the base 8 and serve as electrical contact members for engagement in a lamp socket or other suitable receptacle. A central post 18 depends from the base 8 and serves the dual purpose of providing a protective enclosure for the lamp exhaust tube tip and, by means of a keyway 19 with which it is provided, aids in the proper orientation of the lamp in its socket or receptacle.

The reflector 20, comprising a glass piece having a coating of light-reflecting material thereon, is disposed within the lamp envelope 2 and spaced therefrom. The reflector 20 is provided with a centrally located, elongated aperture within which a ceramic plug 22 is fitted. Filament support wires 24 and 26 extend through the ceramic plug 22 and are secured therein. A main filament 28 is supported by the wires 24 and 26 near the front ends thereof. One end of a ballast filament 30 is secured to the support wire 26 near the front end thereof, and the other end of the ballast filament 30 is secured to one end of a connecting rod 32. The other end of the connecting rod 32 is secured to lead-in wire 14. Wire 34, which functions as a fuse protected by a glass sleeve 36, connects the rear end of filament support wire 24 to lead-in wire 15.

A substantially rectangular spring steel clip 38 having a centrally located elongated aperture is slipped over the ceramic plug 22. The clip 38 has turndown edges terminating in bearing surfaces a, b, c and d which abut the back of the reflector 20. The reflector 20, plug 22 and clip 38 are accurately and firmly secured to one another by wedges 40 which are driven through the plug 22 from opposite sides thereof and through a slot provided therefor in the plug. The driven wedges exert a substantial force on the clip 38 and this force is transmitted to the reflector 20. However, the force is applied to the reflector 20 through the four widely separated resilient bearing surfaces a, b, c and d. Thus, although a force quite ample to accurately and firmly support the reflector is applied, the distribution thereof in the manner as aforesaid prevents damage to the glass reflector.

Figure 3:
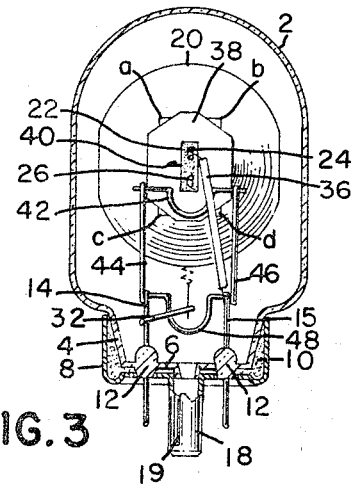
FIGURE 3 is a rear elevational view of the lamp of FIGS. 1 and 2.
Figure 4:
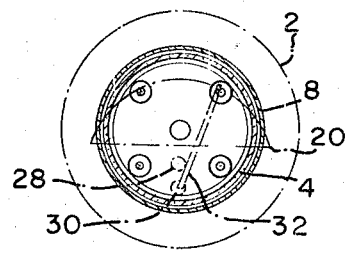
FIGURE 4 is a transverse sectional view of the lamp of FIGURE 1, taken along the line 4—4 thereof.

The spring clip 38 is provided with a U-brace 42 secured thereto across the lower end thereof, as shown particularly in FIG. 3. Struts 44 and 46 are each attached at one end thereof to a leg of the U-brace 42, the other ends thereof being attached to lead-in wires 16 and 17 respectively. Thus the struts 44 and 46, through the U-brace 42 support the spring clip 38 from the lead-in wires 16 and 17. Rigidity of the inner ends of the lead-in wires 16 and 17, and thus an assured uniform spacing of these wires from one another, is obtained by the U-brace 48.

While there has been shown and described what is at present considered the preferred embodiment of the invention, it will be obvious to those skilled in the art that various changes and modifications may be made therein without departing from the invention as defined by the appended claims.

What we claim is:

1. A projection lamp comprising: an hermetically sealed glass envelope; a plurality of lead-in wires sealed in said envelope; a filament disposed in said envelope and connected to two of said lead-in wires; a glass reflector disposed in said envelope and spaced from the inner wall thereof, said reflector being further disposed in light-reflecting relationship with respect to said filament; and means for supporting said reflector disposed as aforesaid, said means comprising a ceramic plug fitted in said reflector and a substantially rectangular spring clip fitted over said plug and wedged against the back of said reflector, each corner of said clip having turndown edges terminating in bearing surfaces abutting the back of said reflector.

2. The combination of claim 1 in which said clip is wedged against the back of said reflector by means of a pair of wedges driven through said plug from opposite sides thereof.

References Cited

UNITED STATES PATENTS 2,980,818 4/1961 Harris et al. _____ 313—113
3,160,776 12/1964 Cardwell et al. _____ 313—331 X JAMES W. LAWRENCE, *Primary Examiner.*

R. JUDD, *Assistant Examiner.*